United States Patent [19]

Schmidlin

[11] Patent Number: 4,876,561

[45] Date of Patent: Oct. 24, 1989

[54] PRINTING APPARATUS AND TONER/DEVELOPER DELIVERY SYSTEM THEREFOR

[75] Inventor: Fred W. Schmidlin, Pittsford, N.Y.

[73] Assignee: Xerox Corporation, Stamford, Conn.

[21] Appl. No.: 200,277

[22] Filed: May 31, 1988

[51] Int. Cl.⁴ .............................................. G01D 15/00

[52] U.S. Cl. .................................. 346/159; 346/153.1

[58] Field of Search ................ 346/159, 139 C, 153.1; 400/119; 361/230; 355/3 DD; 250/324, 325, 423 R

[56] References Cited

U.S. PATENT DOCUMENTS

| | | | |
|---|---|---|---|
| 3,689,935 | 9/1972 | Pressman et al. | 346/74 ES |
| 3,778,678 | 12/1973 | Masuda | 317/3 |
| 3,801,869 | 4/1974 | Masuda | 317/3 |
| 3,872,361 | 3/1975 | Masuda | 317/262 E |
| 4,491,855 | 1/1985 | Fujii et al. | 346/159 |
| 4,515,882 | 5/1985 | Mammino et al. | 430/58 |
| 4,562,447 | 12/1985 | Takumi | 346/159 |
| 4,568,955 | 2/1986 | Hosoya et al. | 346/153.1 |
| 4,647,179 | 3/1987 | Schmidlin | 355/3 DD |

*Primary Examiner*—Arthur G. Evans

[57] ABSTRACT

Direct electrostatic printing (DEP) is optimized by presenting well charged toner to a charged toner conveyor which conveys the toner to an apertured printhead structure for propulsion therethrough. The charged toner conveyor comprises a plurality of electrodes wherein the electrode density (i.e. over 400 electrodes per inch) is relatively large for enabling a high toner delivery rate without risk of air breakdown. The printhead structure is constructed for minimization of aperture clogging. To this end the thickness of the printhead structure is about 0.025 mm and the aperture diameter (i.e. 0.15 mm) is large compared to the printhead thickness.

14 Claims, 1 Drawing Sheet

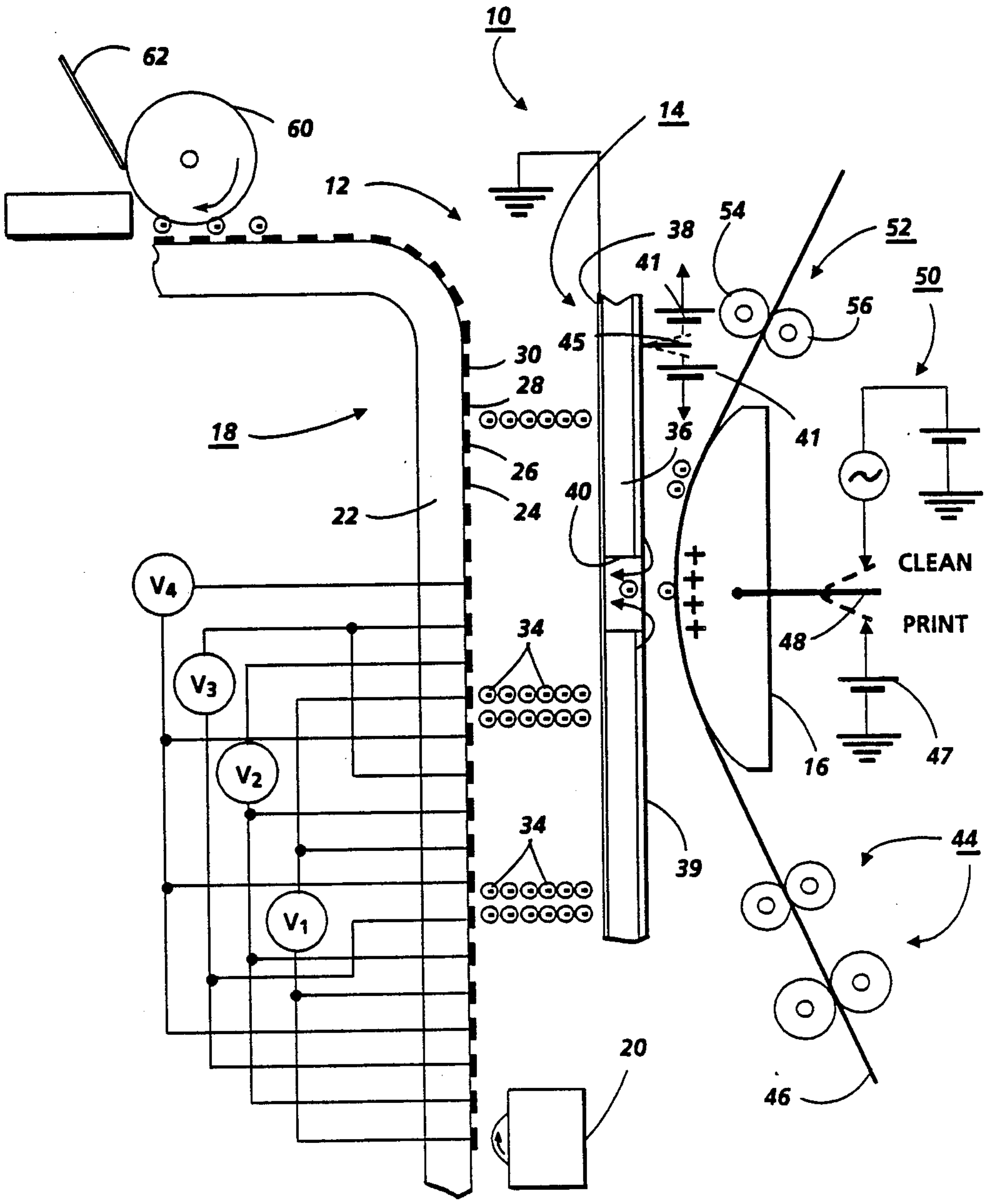
10
62
60
14
12
38
54
52
41
56
50
45
30
28
41
18
36
26
40
22
24
CLEAN
V4
48
PRINT
34
V3
47
V2
16
34
39
44
V1
20
46

PRINTING APPARATUS AND TONER/DEVELOPER DELIVERY SYSTEM THEREFOR

BACKGROUND OF THE INVENTION

This invention relates to electrostatic printing devices and more particularly to a developer or toner delivery system for presenting developer or toner to an electronically addressable printhead utilized for depositing developer in image configuration on plain paper substrates.

Of the various electrostatic printing techniques, the most familiar and widely utilized is that of xerography wherein latent electrostatic images formed on a charge retentive surface are developed by a suitable toner material to render the images visible, the images being subsequently transferred to plain paper.

A lesser known and utilized form of electrostatic printing is one that has come to be known as direct electrostatic printing (DEP). This form of printing differs from the aforementioned xerographic form, in that, the toner or developing material is deposited directly onto a plain (i.e. not specially treated) substrate in image configuration. This type of printing device is disclosed in U.S. Pat. No. 3,689,935 issued Sept. 5, 1972 to Gerald L. Pressman et al.

Pressman et al disclose an electrostatic line printer incorporatin a multilayered particle modulator or printhead comprising a layer of insulating material, a continuous layer of conducting material on one side of the insulating layer and a segmented layer of conducting material on the other side of the insulating layer. At least one row of apertures is formed through the multilayered particle modulator. Each segment of the segmented layer of the conductive material is formed around a portion of an aperture and is insulatively isolated from every other segment of the segmented conductive layer. Selected potentials are applied to each of the segments of the segmented conductive layer while a fixed potential is applied to the continuous conductive layer. An overall applied field projects charged particles through the row of apertures of the particle modulator and the density of the particle stream is modulated according to the the pattern of potentials applied to the segments of the segmented conductive layer. The modulated stream of charged particles impinge upon a print-receiving medium interposed in the modulated particle stream and translated relative to the particle modulator to provide line-by-line scan printing. In the Pressman et al device the supply of the toner to the control member is not uniformly effected and irregularities are liable to occur in the image on the image receiving member. High-speed recording is difficult and moreover, the openings in the printhead are liable to be clogged by the toner.

U.S. Pat. No. 4,491,855 issued on Jan. 1, 1985 in the name of Fujii et al discloses a method and apparatus utilizing a controller having a plurality of openings or slit-like openings to control the passage of charged particles and to record a visible image by the charged particles directly on an image receiving member. Specifically disclosed therein is an improved device for supplying the charged particles to a control electrode that has allegedly made high-speed and stable recording possible. The improvement in Fujii et al lies in that the charged particles are supported on a supporting member and an alternating electric field is applied between the supporting member and the control electrode. Fujii et al purports to obviate the problems noted above with respect to Pressman et al. Thus, Fujii et al alleges that their device makes it possible to sufficiently supply the charged particles to the control electrode without scattering them.

U.S. Pat. No. 4,568,955 issued on Feb. 4, 1986 to Hosoya et al discloses a recording apparatus wherein a visible image based on image information is formed on an ordinary shee by a developer. The recording apparatus comprises a developing roller spaced at a predetermined distance from and facing the ordinary sheet and carrying the developer thereon. It further comprises a recording electrode and a signal source connected thereto for propelling the developer on the developing roller to the ordinary sheet by generating an electric field between the ordinary sheet and the developing roller according to the image information. A plurality of mutually insulated electrodes are provided on the developing roller and extend therefrom in one direction. An A.C. and a D.C. source are connected to the electrodes, for generating an alternating electric field between adjacent ones of the electrodes to cause oscillations of the developer found between the adjacent electrodes along electric lines of force therebetween to thereby liberate the developer from the developing roller. In a modified form of the Hosoya et al device, a toner reservoir is disposed beneath a recording electrode which has a top provided with an opening facing the recording electrode and an inclined bottom for holding a quantity of toner. In the toner reservoir are disposed a toner carrying plate as the developer carrying member, secured in a position such that it faces the end of the recording electrode at a predetermined distance therefrom and a toner agitator for agitating the toner.

The toner carrying plate of Hosoya et al is made of an insulator. The toner carrying plate has a horizontal portion, a vertical portion descending from the right end of the horiziontal portion and an inclined portion downwardly inclining from the left end of the horiziontal portion. The lower end of the inclined portion is found near the lower end of the inclined bottom of the toner reservoir and immersed in the toner therein. The lower end of the vertical portion is found near the upper end of the inclined portion and above the toner in the reservoir.

The surface of the toner carrying plate is provided with a plurality of uniformly spaced parallel linear electrodes extending in the width direction of the toner carrying plate. At least three AC voltages of different phases are applied to the electrodes. The three-phase AC voltage source provides three-phase AC voltages 120 degrees out of phase from one another. The terminals are connected to the electrodes in such a manner that when the three-phase AC voltages are applied a propagating alternating electric field is generated which propagates along the surface of the toner carrying plate from the inclined portion to the horizontal portion.

The toner which is always present on the surface of lower end of the inclined portion of the toner carrying plate is negatively charged by friction with the surface of the toner carrying plate and by the agitator. When the propagating alternating electric field is generated by the three-phase AC voltages applied to the electrodes, the toner is allegedly transported up the inclined portion of the toner carrying plate while it is oscillated and liberated to be rendered into the form of smoke between adjacent linear electrodes. Eventually, it reaches the horizontal portion and proceeds therealong. When it reaches a development zone facing the recording electrode it is supplied through the opening to the ordinary sheet as recording medium, whereby a visible image is formed. The toner which has not contributed to the formation of the visible image is carried along such as to fall along the vertical portion and then slide down into the bottom of the toner reservoir by the gravitational force to return to a zone, in which the lower end of the inclined portion of the toner carrying plate is found.

U.S. Pat. No. 4,647,179 granted to Fred W. Schmidlin on Mar. 3, 1987 discloses a toner transporting apparatus for use in forming powder images on an imaging surface. The apparatus is characterized by the provision of a travelling electrostatic wave conveyor for the toner particles for transporting them from a toner supply to an imaging surface. The conveyor comprises a linear electrode array consisting of spaced apart electrodes to which a multiphase a.c. voltage is connected such that adjacent electrodes have phase shifted voltages applied thereto which cooperate to form the travelling wave.

U.S. Pat. No. 3,872,361 issued to Masuda discloses an apparatus in which the flow of particulate material along a defined path is controlled electrodynamically by means of elongated electrodes curved concentrically to a path, as axially spaced rings or interwound spirals. Each electrode is axially spaced from its neighbors by a distance about equal to its diameter and is connected with one terminal of a multi-phase alternating high voltage source. Adjacent electrodes along the path are connected with different terminals in a regular sequence, producing a wave-like, non-uniform electric field that repels electrically charged particles axially inwardly and tends to propel them along the path.

U.S. Pat. No. 3,778,678 also issued to Masuda relates to a similar device as that disclosed in the aforementioned '361 patent.

U.S. Pat. No. 3,801,869 issued to Masuda discloses a booth in which electrically charged particulate material is sprayed onto a workpiece having an opposite charge, so that the particles are electrostatically attracted to the workpiece. All of the walls that confront the workpiece are made of electrically insulating material. A grid-like arrangement of parallel, spaced apart electrodes, insulated from each other extends across the entire area of every wall, parallel to a surface of the wall and in intimate juxtaposition thereto. Each electrode is connected with one terminal of an alternating high voltage source, every electrode with a different terminal than each of the electrodes laterally adjacent to it, to produce a constantly varying field that electrodynamically repels particles from the wall. While the primary purpose of the device disclosed is for powder painting, it is contended therein that it can be used for electrostatic ior electrodynamic printing.

The Masuda devices all utilize a relatively high voltage source (i.e. 5-10 L KV) operated at a relatively low frequency, i.e. 50 Hz, for generating his travelling waves. In a confined area such as a tube or between parallel plates the use of high voltages is tolerable and in the case of the '869 patennt even necessary since a high voltage is required to charge the initially uncharged particles.

In U.S. patent application Ser. No. 374,376, now abandoned and its foreign counterpart filed in Japan on May 7, 1981 there is disclosed a device comprising an elongated conduit which utilizes travelling waves for transporting toner from a supply bottle to a toner hopper.

U.S. patent application Ser. No. 946,937 filed in the name of Schmidlin et al and assigned to the same assignee as the instant invention discloses an electrostatic printing apparatus including structure for delivering developer or toner particles to a printhead forming an integral part of the printing device. Alternatively, the toner particles can be delivered to a charge retentive surface containing latent images. The developer or toner delivery system is adapted to deliver toner containing a minimum quantity of wrong sign and size toner. To this end, the developer delivery system includes a pair of charged toner conveyors which are supported in face-to-face relation. A bias voltage is applied across the two conveyors to cause toner of one charge polarity to be attracted to one of the conveyors while toner of the opposite is attracted to the other conveyor. One of charged toner conveyors delivers toner of the desired polarity to an apertured printhead where the toner is attracted to various apertures thereof from the conveyor.

In another embodiment of the '937 application, a single charged toner conveyor is supplied by a pair of three-phase generators which are biased by a dc source which causes toner of one polarity to travel in one direction on the electrode array while toner of the opposite polarity travels generally in the opposite direction.

In an additional embodiment disclosed in the '937 application, a toner charging device is provided which charges uncharged toner particles to a level sufficient for movement by one or the other of the aforementioned charged toner conveyors.

The toner in a device such as disclosed in the '937 application is extracted from the "tops" of the clouds via the fringe fields that extend into the clouds from around the apertures. The efficiency of toner usage in a charged toner conveyor of the type disclosed in the '937 application is currently limited by the relatively dilute toner density in the "tips" of the toner clouds that are transported thereby.

U.S. patent application Ser. No. 926,129 filed in the name of Fred W. Schmidlin and assigned to the same assignee as the instant invention discloses a direct electrostatic printing apparatus including structure for delivering developer or toner particles to a printhead forming an integral part of the printing device. The printing device includes, in addition to the printhead, a conductive shoe which is suitably biased during a printing cycle to assist in the electrostatic attraction of developer through apertures in the printhead onto the copying medium disposed intermediate the printhead and the conductive shoe. The structure for delivering developer or toner is adapted to deliver toner containing a minimum quantity of wrong sign and size toner. To this end, the developer delivery system includes a conventional magnetic brush which delivers toner to a donor roll structure which, in turn, delivers toner to the vicinity of apertures in the printhead structure.

U.S. patent application Ser. No. 140,266 filed in the name of Fred W. Schmidlin and assigned to the same assignee as the instant invention discloses a direct electrostatic printing apparatus including structure for delivering developer or toner particles to a printhead forming an integral part of the printing device. The printing device includes, in addition to an apertured printhead, a conductive shoe which is suitably biased during a printing cycle to assist in the electrostatic attraction of developer through apertures in the printhead onto the copying medium disposed intermediate the printhead and the conductive shoe. Developer or toner is delivered to the printhead via a pair of opposed charged toner or developer conveyors. One of the conveyors is attached to the printhead and has an opening therethrough for permitting passage of the developer or toner from between the conveyors to areas adjacent the apertures in the printhead.

U.S. patent application Ser. No. 926,158 filed in the name of Fred W. Schmidlin and assigned to the same assignee as the instant invention discloses a direct electrostatic printing apparatus including structure for removing wrong sign developer particles from a printhead forming an an integral part of the printing device. The printing device includes, in addition to the printhead, a conductive shoe which is suitably biased during a printing cycle to assist in the electrostatic attraction of developer passing through apertures in the printhead onto the copying medium disposed intermediate the printhead and the conductive shoe. During a cleaning cycle, the printing bias is removed from the shoe and an electrical bias suitable for creating an oscillating electrostatic field which effects removal of toner from the printhead is applied to the shoe.

With regard to the device described by Hosoya in U.S. Pat. No. 4,568,955, it is obvious to anyone skilled in electrostatics that the toner resting in the bottom of the reservoir under the force of gravity alone must be charge neutral or very nearly neutral. Thus, even though some toner may be charged by friction with the agitator installed in the bottom of the reservoir, as alleged by Hosoya, other nearby toner must acquire charge of the opposite polarity. As a result, any toner extracted from the bed by the toner carrying plate, with its inclined end immersed in said bed of toner, must be toner having a charge which is low in absolute value and/or of mixed polarity. It should also be noted that since the toner carrying plate has a relatively course grid structure (less than 50 lines per inch), it must operate at high voltages (>1000 volts rms) and at relatively low frequency (<1000 Hz). In other words, from the course grid structure and the fact that it is alleged to extract toner from a reservoir, it is evident that Hosoya's device is intended to operate much like Masuda's electric curtain which normally transports bipolar material. Another feature of Hosoys's toner carrying plate which necessitates the handling of neutral or mixed polarity toner is the absence of any means to aid the return of the toner to the reservoir. If the toner did possess a net charge the pile of toner accumulated in the reservoir near the end of the toner carrying plate would produce a strong repulsive field and prevent additional toner from escaping from the toner carrying member. Experience with transporting charge toner via a travelling wave shows that charged toner must be assisted off the carrying plate or it will block and back up on the plate in a manner analogous to a traffic jam and further transport comes to a halt. Still another feature of Hosoya's device which restricts it to the use of low charged toner or very low toner density in the transported cloud, called "smoke" by Hosoya, is the relatively large distance (~2 mm) between the toner carrying plate and the control aperture. Because of these features Hosoya's printer is restricted to printing at very low speeds (<1 cm/sec) and is incapable of printing page length (~27 cm) images without plugging the apertures. The present invention overcomes these limitations and makes it possible to repeatedly print page length images at high speeds (>2 cm/sec) for extended periods of time.

BRIEF DESCRIPTION OF THE INVENTION

Direct electrostatic printing (DEP) is optimized by presenting well charged toner to a charged toner conveyor which conveys the toner to an apertured printhead structure for propulsion therethrough. The charged toner conveyor comprises a plurality of electrodes wherein the electrode density (i.e. over 100 electrodes per inch) is relatively large for enabling a high toner delivery rate without risk of air breakdown. The printhead structure is constructed for minimization of aperture clogging. To this end the thickness of the printhead structure is about 1 mil (0.025 mm) and the aperture diameter (i.e. 6 mils (0.15 mm)) is large compared to the printhead thickness.

A magnetic brush arrangement may be employed for delivering the well charged toner to the charged toner conveyor. Well charged toner is defined as toner which is predominantly of one polarity and has a narrow charge distribution or in other words a small percentage of wrong sign toner. Other arrangements may also be employed such as jumping development. Toner supplies known as single component development systems that deliver relatively poorly charged toner may even be used providing they are followed by a charge filtering device such as described in U.S. patent application Ser. No. 946,937 before transporting the toner to the printhead.

By providing a charged toner conveyor having a high electrode density, the field lines do not have to extend over a large distance. Thus, high field strengths can be obtained with relatively low voltages. By utilizing a large aperture diameter/printhead thickness ratio and by using a printhead that has a relatively small thickness, strong fields are created which minimize aperture clogging.

DETAILED DESCRIPTION OF THE DRAWINGS

The FIGURE is a schematic illustration of a printing apparatus representing the present invention.

DESCRIPTION OF THE PREFERRED EMBODIMENT OF THE INVENTION

Disclosed in the FIGURE is an embodiment of a direct electrostatic printing apparatus 10 representing the invention.

The printing apparatus 10 includes a developer delivery or conveying system generally indicated by reference character 12, a printhead structure 14 and a backing electrode or shoe 16.

The developer delivery system 12 includes a charged toner conveyors (CTC) 18 and a magnetic brush developer supply 20. The charged toner conveyor 18 comprises a base member 22 and an electrode array comprising repeating sets of electrodes 24, 26 and 28 to which are connected A.C. voltage sources $V_1$, $V_2$ $V_3$ and $V_4$ which voltages are phase shifted one from the other so that an electrostatic travelling wave pattern is established.

The effect of the travelling wave patterns established by the conveyor 18 is to cause already charged toner particles 34 delivered to the conveyor via the developer supply 20 to travel along the CTC to an area opposite the printhead apertures 42 where they come under the influence of electrostatic fringe fields emanating from the printhead 14 and ultimately under the influence of the field created by the voltage applied to the shoe 16. To enhance the interaction between the fringe fields and the toner travelling on the CTC the distance between the CTC and the printhead should be less than three wavelengths, or 12 electrode spacings on the CTC for a four phase CTC, and preferably less than one wavelength. A narrow CTC/printhead spacing facilitates a high delivery rate of usable toner and therefore a high printing speed.

By way of example, the developer comprises any suitable insulative non-magnetic toner/carrier combination having Aerosil (Trademark of Degussa, Inc.) contained therein in an amount approximately equal to 0.3 to 0.5% by weight and also having zinc stearate contained therein in an amount approximately equal to 0.1 to 1.0% by weight. It should be appreciated however that the optimal amount of additives (Aerosil and zinc stearate) will vary depending on the base toner material, coating material on the CTC and the toner supply device.

The printhead structure 14 comprises a layered member including an electrically insulative base member 36 fabricated from a polyimide film having a thickness in the order of 1 to 2 mils (0.025 to 0.50 mm). The base member is clad on the one side thereof with a continuous conductive layer or shield 38 of aluminum which is approximately 1 micron (0.001 mm thick). The opposite side of the base member 36 carries segmented conductive layer 39 thereon which is fabricated from aluminum and has a thickness similar to that of the shield 38. The total thickness of the printhead structure is in the order of 0.001 to 0.002 inch (0.027 to 0.052 mm).

A plurality of holes or apertures 40 (only one of which is shown) approximately 0.15 mm in diameter are provided in the layered structure in a pattern suitable for use in recording information. The apertures form an electrode array of individually addressable electrodes. With the shield grounded and with 0–100 volts applied to an addressable electrode, toner is propelled through the aperture associated with that electrode. The aperture extends through the base 36 and the conductive layers 38 and 39.

With a negative 350 volts applied to an addressable electrode toner is prevented from being propelled through the aperture. Image intensity can be varied by adjusting the voltage on the control electrodes between 0 and minus 350 volts. Addressing of the individual electrodes can be effected in any well known manner know in the art of printing using electronically addressable printing elements.

The electrode or shoe 16 has an arcuate shape as shown but as will be appreciated, the present invention is not limited by such a configuration. The shoe which is positioned on the opposite side of a plain paper recording medium 46 from the printhead 14 supports the recording medium in an arcuate path in order to provide an extended area of contact between the medium and the shoe.

The recording medium 16 may comprise roll paper or cut sheets of paper fed from a supply tray, not shown. The recording medium is spaced from the printhead 14 a distance in the order of 0.002 to 0.030 inch as it passes thereby. As a general rule the smaller the spacing the higher the resolution at higher printing speeds though at the expense of maintaining greater precision in the gap between the printhead and paper. The recording medium 46 is transported in contact with the shoe 16 via edge transport roll pairs 44.

During printing the shoe 16 is electrically biased to a dc potential of approximately 400 volts via a dc voltage source 47. Toner on the CTC not passed through the printhead is removed from the CTC downstream with an electrostatic pickoff device comprising a biased roll 60 and scraper blade 62. A vacuum pickoff device can be used in lieu of the electrostatic one.

In the event that any wrong sign toner becomes agglomerated on the printhead, switch 48 is periodically actuated in the absence of a sheet of paper between the printhead and the shoe such that a dc biased AC power supply 50 is connected to the the shoe 16 to effect cleaning of the printhead. The voltage from the source 50 is supplied at a frequency which causes the toner in the gap between the paper and the printhead to oscillate and bombard the printhead.

Momentum transfer between the oscillating toner and any toner on the control electrodes of the printhead causes the toner on the control electrodes to become dislodged. The toner so dislodged is deposited on the substrates subsequently passed over the shoe 16.

At the fusing station, a fuser assembly, indicated generally by the reference numeral 52, permanently affixes the trannsferred toner powder images to recording medium 46. Preferably, fuser assembly 52 includes a heated fuser roller 54 adapted to be pressure engaged with a back-up roller 56 with the toner powder images contacting fuser roller 54. In this manner, the toner powder image is permanently affixed to copy substrate 46. After fusing, a chute, not shown, guides the advancing recording medium 46 to catch tray, also not shown, for removal from the printing machine by the operator.

A typical width for each of the electrodes for the travelling wave grid is 1 to 4 mils (0.025 to 0.10 mm). Typical spacing between the centers of the electrodes is twice the electrode width and the spacing between adjacent electrodes is approximately the same as the electrode width. Typical operating frequency is between 1000 and 10,000 Hz for 125 Ipi grids 4 mil (0.10 mm) electrodes, the drive frequency for maximum transport being 2,000 Hz.

A typical operating voltage is relatively low (i.e. less than the Paschen breakdown value) and is in the range of 30 to 1000 depending on grid size, a typical value being approximately 500 V for a 125 Ipi grid. Stated differently, the desired operating voltage is approximately equal to 100 times the spacing between centers of adjacent electrodes.

While the electrodes may be exposed metal such as Cu or Al it is preferred that they be covered or overcoated with a thin oxide or insulator layer. A thin coating having a thickness of about half of the electrode width will sufficiently attenuate the higher harmonic frequencies and suppress attraction to the electrode edges by polarization forces. A slightly conductive over-coating will allow for the relaxation of charge accumulation due to charge exchange with the toner. To avoid excessive alteration of the toner charge as it moves about the conveyor, however, a thin coating of a material which is non-tribo active with respect to the toner is desirable. A weakly tribo-active material which maintains the desired charge level may also be utilized.

A preferred overcoating layer comprises a strongly injecting active matrix such as the disclosed in U.S. Pat.

No. 4,515,882 granted in the name of Joseph Mammino et al on or about May 7, 1985 and assigned to the same assignee as the instant application. As disclosed therein, the layer comprises an insulating film forming continuous phase comprising charge transport molecules and finely divided charge injection enabling particles dispersed in the continuous phase. A polyvinylfluoride film available from the E. I. duPont de Nemours and Company under the tradename Tedlar has also been found to be suitable for use as the overcoat.

While a single CTC has been disclosed it will be appreciated that cooperating charged toner conveyors such as disclosed in the 140,266 application could be utilized.

What is claimed is:

1. Direct electrostatic printing apparatus, said apparatus comprising:

a supply of well charged toner particles;

an apertured printhead structure;

an image receiving member disposed adjacent one side of said apertured printhead;

a charged toner conveyor including a plurality of spaced-apart electrodes, said charged toner conveyor being disposed adjacent said supply of well charged toner and the opposite side of said apertured printhead for moving toner particles from said supply to an area adjacent said printhead;

a source of electrical power operatively connected to said spaced-apart electrodes for creating wave energy for effecting the movement of toner particles;

said printhead being electrically biased to establish an electrostatic field thereacross; and said apertured printhead having a thickness in the direction of toner particle movement that is relatively small to thereby maximize the field strength of said electrostatic field whereby aperture clogging is minimized.

2. Apparatus according to claim 1 wherein said spaced-apart electrodes have an electrode density enabling a relatively high toner delivery rate to said apertured printhead without risk of air breakdown.

3. Apparatus according to claim 2 wherein said electrode density comprises approximately 250 electrodes per inch.

4. Apparatus according to claim 3 wherein the apertures in said printhead have a large diameter relative to the thickness of the printhead structure.

5. Apparatus according to claim 4 wherein the thickness of said apertured printhead is less than 0.1 mm.

6. Apparatus according to claim 5 wherein the diameter of said apertures is approximately 0.15 mm.

7. Apparatus according to claim 6 wherein said image receiving member comprises plain paper.

8. Apparatus according to claim 6 wherein the width of each electrode of the charged toner conveyor is in the order of 0.050 mm.

9. Apparatus according to claim 5 wherein the spacing between electrodes of said charged toner conveyor is approximately 0.050 mm.

10. Apparatus according to claim 9 wherein said voltage is operated at a frequency of approximately 1000 Hz or greater.

11. Apparatus according to claim 10 wherein said electrodes are coplanar.

12. Apparatus according to claim 1 including means for removing unused toner from said charged toner conveyor.

13. Apparatus according to claim 1 wherein said printhead is spaced from said charged toner conveyor a distance less than three wavelengths.

14. Apparatus according to claim 9 wherein the distance between said charged toner conveyor and said printhead is approximately 0.3 mm.

* * * * *